J. L. WOODBRIDGE.
SYSTEM OF ELECTRICAL DISTRIBUTION.
APPLICATION FILED NOV. 26, 1913.
1,211,802.
Patented Jan. 9, 1917.
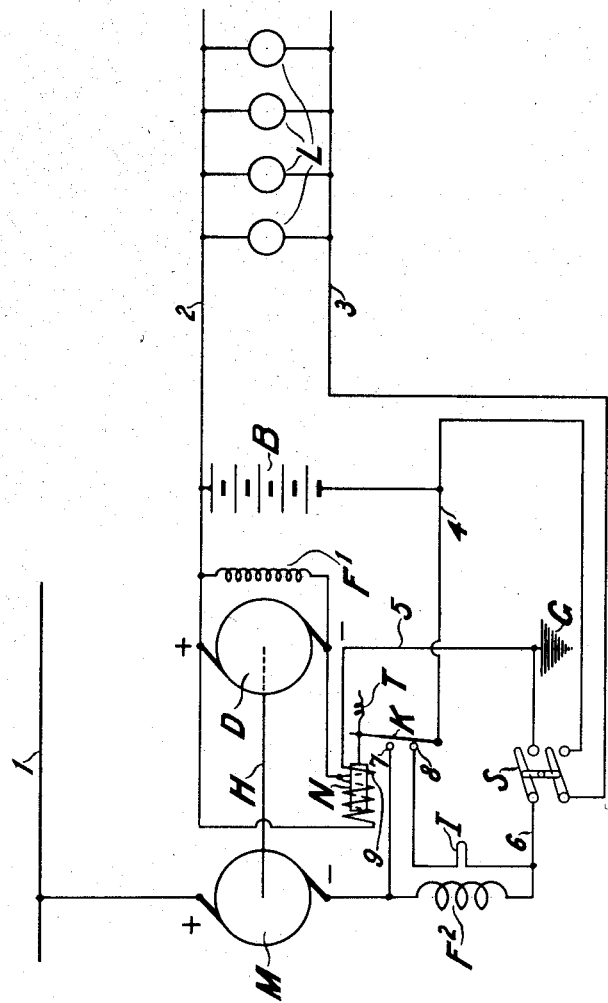
WITNESSES:
Joseph H. Tracy
INVENTOR
J. Lester Woodbridge,
BY
Augustus B. Stoughton.
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,211,802.   Specification of Letters Patent.   Patented Jan. 9, 1917.

Application filed November 26, 1913. Serial No. 803,125.

*To all whom it may concern:*

Be it known that I, JOSEPH LESTER WOODBRIDGE, a citizen of the United States, and a resident of Philadelphia, in the State of Pennsylvania, have invented certain new and useful Improvements in Systems of Electrical Distribution, of which the following is a specification.

My invention relates to systems in which a source of electrical energy of variable voltage is used to supply energy for constant voltage translating devices, such as electric lights, and is particularly adapted for use where the source of electrical energy is of comparatively high voltage, such as that of a trolley system, and the translating devices are adapted for a comparatively low voltage, such as a low voltage lighting circuit in a trolley car.

The object of my invention is to provide a steady voltage for the translating devices, notwithstanding variations of voltage in the source, and also to provide energy for maintaining an uninterrupted supply of current to the translating devices during intervals of interruption of supply from the original source. This and other objects of the invention will be more clearly understood by reference to the following description and the accompanying drawing which is a diagrammatic representation of a system embodying features of the invention.

In the drawing 1 is the positive conductor of the circuit which supplies the electrical energy, the opposite side of the circuit being represented by the ground connection G. A motor generator set is shown of which the motor is represented at M and the generator at D, the two being mechanically connected by a common shaft H. The motor M is a series wound motor, whose series field is shown at $F^2$. The dynamo D is a shunt wound dynamo whose field winding is shown at $F^1$. The positive terminal of the motor is connected to conductor 1 while the negative terminal is connected through the series field winding $F^2$ and conductor 6 and one blade of the switch S when the latter is closed to the ground connection G. The positive terminal of the dynamo D is connected to conductor 2 of the lamp circuit, the lamps being shown at L, while the negative terminal of the dynamo is connected through series coil 9 of switch K and conductor 5 to the ground connection G. The automatic switch K is closed by a solenoid N, connected across the terminals of the dynamo D and when thus closed makes electrical connection between the contacts 7 and 8, thus closing a circuit in parallel with the field winding $F^2$ which circuit includes an iron wire resistance I. This resistance is so designed as to have the well known constant current characteristics within the range of voltage variation to which it is subjected in the normal operation of the system herein described. Switch K when closed also connects conductor 4 to the two contact points 7 and 8.

Switch S is a double pole switch, one of the blades of which, as above stated, connects conductor 6 to the ground connection, while the other blade connects conductor 4 with conductor 3, the latter constituting the negative conductor of the lamp circuit. A storage battery B is also shown connected across conductors 2 and 4.

The mode of operation of this apparatus is as follows: When the switch S is open the motor is disconnected from the ground and can, therefore, receive no current; the lamp circuit 3 is also disconnected from conductor 4 and the battery and can receive no current. When it is desired to operate the lights L, the switch S is closed which connects conductor 3 to the battery, and at the same time connects the negative terminal of the motor to the ground and the motor will start up driving the dynamo D by means of the shaft H. The negative terminal of the dynamo D is, however, disconnected from the battery and lamp circuit so long as the switch K is open. As soon, however, as the voltage of the dynamo D has reached the desired value corresponding with that of the battery and lamp circuit the switch K will be closed by the solenoid N connecting the iron wire resistance I in parallel with the field winding $F^2$, and also connecting conductor 4 and the negative terminal of the battery to the ground through the field winding $F^2$ and the iron wire resistance I. The dynamo will then be connected to supply current to the battery and lamps.

The design of the iron wire resistance should be such that the constant current which it will transmit is equal to that required by the lamps, plus a small surplus for charging the battery. When the motor M is operating at normal voltage its speed should be such as to develop in the dynamo D a sufficient voltage to supply the lamp load and the small surplus for charging the battery. Under these conditions the motor M will take a certain amount of current which passing through its series field winding $F^2$ will produce a drop of voltage whose value should fall within the range over which the iron wire resistance I exhibits its constant current characteristics. If now the speed of the motor M should tend to increase, due, for example, to a rise of voltage across the circuit $1^G$, a slight increase in speed of the dynamo D would tend to send additional current from the dynamo into the battery B and back from the negative terminal of the battery through conductor 4, field winding $F^2$, conductor 6 and switch S to the negative terminal of the dynamo. Inasmuch as the iron wire resistance I will not permit this additional current to flow, it must all pass through the field winding $F^2$. This increase in current in the field winding $F^2$ will increase the field excitation of the motor M, and prevent an excessive increase of speed due to the rise of voltage across the circuit $1^G$. If the voltage across the circuit $1^G$ is several times that across the battery and lamp circuit, the current output from the dynamo D will be several times the current input to the motor M. A comparatively small variation in the output of the dynamo D will, therefore, be proportionately large as compared with the current input to the motor M. For example, if the voltage across the circuit $1^G$ is 600 and the voltage of the lamp circuit is 30, the output of the dynamo in amperes would be approximately twenty times the input to the motor, neglecting losses. An increase of 5% in the output of the dynamo would, therefore, be equal to the entire current input to the motor, and this increase in the dynamo output passing through the field winding $F^2$ would actually double the field excitation of the motor, and would, therefore, compensate for a wide variation of voltage across the circuit $1^G$. As referred to above this apparatus is especially adapted for supplying current to the lights in an interurban trolley car where the voltage on the trolley circuit varies over a considerable range, and especially where current is supplied by the third rail system in which interruptions occur at highway crossings, etc. In accordance with present practice the lights in such a car are taken directly from the trolley circuit and are subject to all the variations in voltage which occur, and to entire interruption when the car passes over interruptions in the third rail circuit.

The system herein described will give a steady and uninterrupted supply of current to the lights.

In addition to supplying current to the lights when the source of power is interrupted, the battery when present and connected coöperates with the other elements to improve the regulation of voltage on the consumption circuit, due to the fact that owing to its low internal resistance it will receive a very considerable increase of current from the dynamo with a small increase of dynamo voltage. This increase of current passing through the field coil $F^2$ counteracts the tendency to further increase of voltage as described above.

Having described my invention what I desire to claim and secure by Letters Patent is—

1. In combination a motor and a dynamo mechanically connected, a storage battery electrically connected to the dynamo, a field coil for the motor connected in series with the motor armature and also connected between the dynamo and the battery, said coil adapted to increase the motor field excitation upon increase of current input to the motor and also upon increase of current output from the dynamo.

2. A comparatively high voltage motor and a comparatively low voltage dynamo mechanically connected, a storage battery electrically connected to the dynamo, a field coil for the motor connected in series with the motor armature and also connected between the dynamo and the battery, said coil adapted to increase the motor field excitation upon increase of current input to the motor and also upon increase of current output from the dynamo.

3. In combination a variable voltage source of electrical energy, a constant voltage work circuit, a storage battery connected to the work circuit, a dynamo connected to the work circuit, a motor for driving the dynamo connected to the source and a field coil for the motor connected between the dynamo and the work circuit in the direction to strengthen the motor field excitation with increase in current from the generator to the battery.

4. In combination a variable source of electrical energy, a constant voltage work circuit, a storage battery connected to the work circuit, a dynamo connected to the work circuit, a motor for driving the dynamo connected to the source, a field coil for the motor connected between the dynamo and the work circuit and a device adapted to transmit a substantially constant current connected in parallel with the field coil.

5. In combination a variable voltage source of electrical energy, a constant voltage work circuit, a storage battery connected to the work circuit, a dynamo connected to the work circuit, a motor for driving the dynamo connected to the source, a field coil for the motor connected between the dynamo and the work circuit and a resistance of high temperature coefficient in parallel with the field coil.

6. In combination a motor and a dynamo mechanically connected, a storage battery electrically connected to the dynamo, a field coil for the motor connected in series with the motor armature and also connected between the dynamo and the battery, said coil adapted to increase the motor field excitation upon increase of current input to the motor and also upon increase of current output from the dynamo, and a device adapted to transmit a substantially constant current connected in parallel with the field coil.

7. In combination a motor and a dynamo mechanically connected, a storage battery electrically connected to the dynamo, a field coil for the motor connected in series with the motor armature and also connected between the dynamo and the battery, said coil adapted to increase the motor field excitation upon increase of current input to the motor and also upon increase of current output from the dynamo, and a resistance of high temperature coefficient connected in parallel with the field coil.

8. In combination a variable voltage source of electrical energy, a storage battery of comparatively low voltage, a dynamo connected to the storage battery, a motor for driving the dynamo connected to the source, a field coil for the motor connected between the dynamo and the battery in the direction to strengthen the field excitation of the motor upon increase of current from the dynamo to the battery.

9. In combination a variable voltage source of electrical energy, a storage battery of comparatively low voltage, a dynamo connected to the storage battery, a motor for driving the dynamo connected to the source, a field coil for the motor connected between the dynamo and the battery and a device adapted to transmit a substantially constant current connected in parallel with the field coil.

10. In combination a variable voltage source of electrical energy, a storage battery of comparatively low voltage, a dynamo connected to the storage battery, a motor for driving the dynamo connected to the source, a field coil for the motor connected between the dynamo and the battery and a resistance of high temperature coefficient connected in parallel with the field coil.

11. In combination a motor and dynamo mechanically connected, a storage battery connected to the dynamo, a field coil for the motor connected between the dynamo and the battery, and a device adapted to transmit a substantially constant current connected in parallel with the field coil.

12. In combination a motor and dynamo mechanically connected, a storage battery connected to the dynamo, a field coil for the motor connected between the dynamo and the battery, and a resistance of high temperature coefficient connected in parallel with the field coil.

13. In combination a motor and dynamo mechanically connected, a storage battery adapted for connection to the dynamo, a field coil for the motor, a constant current device, and an automatic switch adapted simultaneously to connect the dynamo to the battery through the field coil and the constant current device in parallel with the field coil.

14. In combination a comparatively high voltage source of electrical energy, a motor adapted for connection to the source, a dynamo mechanically connected to the motor, a storage battery and a work circuit connected to the dynamo, a field coil for the motor connected between the dynamo and the battery, and a constant current device connected in parallel with the field coil.

15. In combination a variable voltage source of electrical energy, a motor adapted for connection to the source, a dynamo mechanically connected to the motor, a storage battery, a work circuit connected to the battery, and a field coil for the motor connected between the dynamo and the battery, and also in series with the motor armature.

16. In combination a motor and dynamo mechanically connected, a storage battery adapted for connection to the dynamo, a source of electrical energy for the motor, a work circuit adapted for connection to the storage battery, and a switch for simultaneously connecting the work circuit to the storage battery and the motor to its source.

17. In combination a motor and dynamo mechanically connected and a field coil for the motor connected to carry both the input to the motor and the output of the dynamo whereby an increase of said input or said output will increase the motor field excitation.

18. In combination a motor adapted for comparatively high voltage and a dynamo mechanically connected thereto and adapted for comparatively low voltage, a field winding for the motor connected to carry the combined input to the motor and output from the dynamo whereby an increase of the said input or said output will increase the motor field excitation.

19. In combination a motor and a dynamo mechanically connected, a field coil for the motor arranged to carry the current input to the motor and the current output of the dynamo and a constant current device connected in parallel with said field coil.

20. In combination a motor adapted for comparatively high voltage and a dynamo mechanically connected thereto and adapted for comparatively low voltage, a field coil for the motor connected to carry the input to the motor and the output from the dynamo, and a constant current device connected in parallel with said field coil.

21. In combination a motor adapted for comparatively high voltage and a dynamo mechanically connected thereto and adapted for comparatively low voltage, a field coil for the motor connected to carry the input to the motor and the output from the dynamo and a resistance of high temperature coefficient connected in parallel with said field coil.

In testimony whereof I have hereunto signed my name.

JOSEPH LESTER WOODBRIDGE.

Witnesses:
  J. H. TRACY,
  R. A. WHITSTONE, Jr.